(No Model.)
H. L. HOPKINS.
SAW TABLE GAGE.
No. 300,975. Patented June 24, 1884.
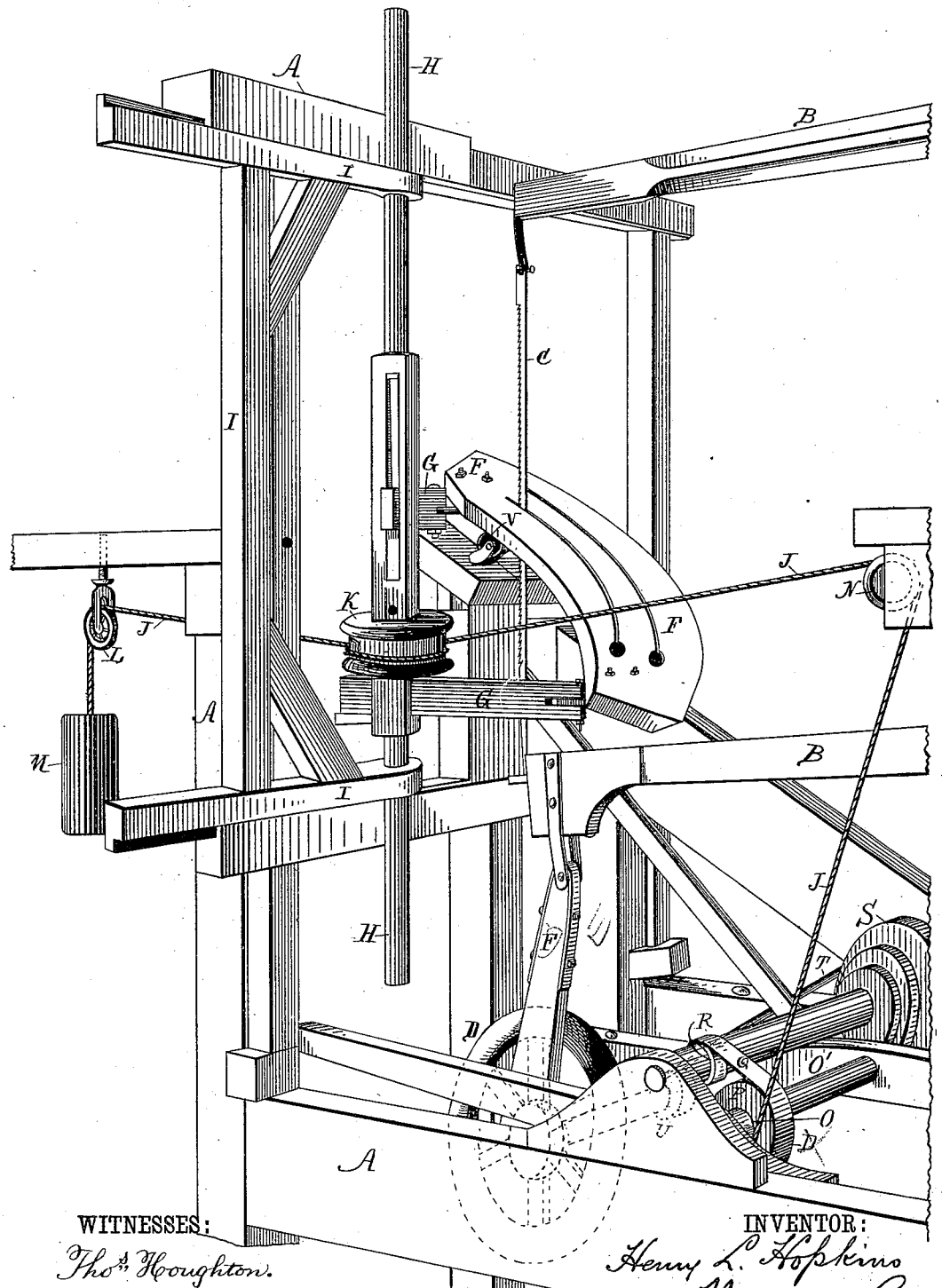
WITNESSES:
Thos. Houghton.
W. X. Stevens.
INVENTOR:
Henry L. Hopkins
BY Munn & Co.
ATTORNEYS.

UNITED STATES PATENT OFFICE.

HENRY L. HOPKINS, OF CARO, MICHIGAN, ASSIGNOR OF THREE-FOURTHS TO WILLIAM J. MALLORY, JOHN KELLY, AND MELZAR M. MALLORY, ALL OF SAME PLACE.

SAW-TABLE GAGE.

SPECIFICATION forming part of Letters Patent No. 300,975, dated June 24, 1884.

Application filed April 25, 1884. (No model.)

*To all whom it may concern:*

Be it known that I, HENRY L. HOPKINS, a citizen of the United States, residing at Caro, in the county of Tuscola and State of Michigan, have invented certain new and useful Improvements in Scroll-Saw Attachments, of which the following is a description.

The object of this invention is to saw curved stair-railings; and it consists in the construction and combination of parts, forming an attachment for scroll-sawing machines, hereinafter described and claimed, reference being had to the accompanying drawing, which is a perspective view of a portion of a scroll-sawing machine showing my invention.

A represents the frame of a common hand or foot power scroll-saw machine; B B, two arms of the saw-frame; C, a common scroll-saw hung in said saw-frame; D, the crank-wheel, and E the pitman connecting the saw-frame therewith.

Any other style of scroll-saw, handsaw, or gig-saw machine may be substituted for the one thus far described.

F is the table upon which I secure the plank from which the stair-rail curve is to be sawed. This table is secured at its two ends to arms G, which are secured radially in a rotary vertical axis, H, in order that the table may revolve around said axis while the vertical lines of the stair-rail are being sawed, to guide the saw to cut the arc of a cylinder. The arms G are radially adjustable, to adapt the table to saw rails of different radii. The axis H is a shaft journaled in a frame, I, fitted to slide at right angles to the plane of the saw. By this means the axis may be set to fit first the shorter radius, in accordance with the set of the arms G, and when the inner arc has been sawed the saw will be disengaged from the frame and inserted through the table in a hole corresponding to the longer radius. The frame I will be moved away until the saw is rehung at the line to be sawed. Then by swinging the table the outer arc of the rail will be sawed parallel to the inner arc. To swing the table I provide a feeding-cord, J, secured to wind around a spool, K, on the shaft H, thence passing one way over a pulley, L, to a weight, M, and passing the other way over a pulley, N, to a spool, O, which winds the cord. The shaft O' is provided with a pulley, P, run by a belt, Q, from an intermediate pulley, R, on a shaft having a cone of pulleys, S, connected by a belt, T, with a cone of pulleys, U, on the main crank-shaft. This line of pulleys is for the purpose of slowing down the speed from that of the saw-stroke to that proper for the feed, and the cones permit the feed to be changed to suit curves of different diameters.

Before sawing the work the table F is set at a slant corresponding to the pitch of the stair-rail by adjusting the upper arm G in the slot shown in the vertical shaft H. The spool O may be disconnected from its drive-shaft, so that the weight M will quickly return the table to place. The table rides upon a roller, V. By this means stair-rails of any pitch and any usual diameter of circle may be quickly and accurately sawed.

What I claim as my invention, and desire to secure by Letters Patent, is—

1. The combination, with a scroll-sawing machine, of a parallel-wayed frame, a pair of ways therefor, to be secured to the sawing-machine in a vertical plane nearly at right angles to the plane of the saw, and a saw-table pivoted in said parallel frame, substantially as and for the purpose specified.

2. The combination, with a parallel-wayed frame and a pair of ways therefor, of a shaft journaled in said frame and a saw-table secured to said shaft, as and for the purpose specified.

3. The combination, with a parallel-wayed frame, a pair of ways therefor, and a shaft journaled therein, of a pair of arms secured in the said shaft at right angles to each other and one above the other, and a table secured upon the said arms, substantially as and for the purpose specified.

4. The combination, with a parallel-wayed frame, a pair of ways therefor, and a shaft journaled therein, of a pair of arms placed transversely in the said shaft, means for adjusting and fixing the said arms in the shaft, and a saw-table secured to the said arms, as shown and described.

5. The combination, with a parallel-wayed frame, a pair of ways therefor, and a shaft journaled therein, of a pair of arms placed transversely in the said shaft, means for adjusting one of said arms longitudinally to the shaft, and a table secured to the arms, substantially as and for the purpose specified.

6. The combination, with a parallel-wayed frame, a pair of ways therefor, a shaft journaled therein, and a pair of arms adjustably fixed at right angles to each other, and one above the other, in the said shaft, of a table fixed inclined on the said arms, and a roller for the said table to ride upon, as and for the purpose specified.

7. The combination, with a transversely-adjustable frame, a shaft journaled therein, arms adjustable in said shaft, a saw-table fixed to said arms, a roller for the said table to ride on, and a sawing-machine, of a spool on the said shaft, a cord fixed thereto, a weight attached on the said cord, guiding-pulleys therefor, and means for winding the said cord on the sawing-machine, substantially as shown and described.

HENRY L. HOPKINS.

Witnesses:
J. RALPH GILLESPIE,
JOS. H. CUMINGS.